United States Patent [19]

Schubert

[11] Patent Number: 5,003,704
[45] Date of Patent: Apr. 2, 1991

[54] DISTANCE MEASURING DEVICE AND METHOD FOR USE WITH VEHICLES

[75] Inventor: Burton L. Schubert, Spearman, Tex.

[73] Assignee: Schubert Farms, Inc., Spearman, Tex.

[21] Appl. No.: 324,084

[22] Filed: Mar. 16, 1989

[51] Int. Cl.$^5$ .......................... G01C 22/00; G01B 3/12
[52] U.S. Cl. ...................................... 33/775; 33/772; 235/95 B; 377/24.1
[58] Field of Search ................. 33/775, 772, 773, 778, 33/779, 780, 600, 124; 235/95 B, 95 R; 377/24.1

[56] References Cited

U.S. PATENT DOCUMENTS

| 323,498 | 8/1885 | Coffin | 33/124 |
|---|---|---|---|
| 2,674,411 | 4/1954 | Cochnar | 235/95 R |
| 3,215,545 | 5/1966 | Looney | 33/772 |
| 3,700,164 | 10/1972 | Slagle | 33/772 |
| 4,044,471 | 8/1977 | Peterson | 377/24.1 |
| 4,430,800 | 2/1984 | Shimano | 235/95 R |
| 4,563,574 | 1/1986 | Dreyer et al. | 235/95 B |
| 4,807,265 | 2/1989 | Swanson | 377/24.1 |

Primary Examiner—William A. Cuchlinski, Jr.
Assistant Examiner—C. W. Fulton
Attorney, Agent, or Firm—Melvin A. Hunn

[57] ABSTRACT

A means is provided for measuring distance travelled by a vehicle having a wheel coupled to a vehicle axle disposed within a vehicle axle housing, with the wheel haivng at least one nonmagnetized metal region which rotates with the wheel defining an orbit through which the nonmagnetized metal region passes as the wheel rotates to advance the vehicle. The apparatus includes an inductive proximity sensor and a counter means. The inductive proximity sensor is of the type adapted for detecting the presence of nonmagnetized metal within a sensing distance and producing an electrical response thereto; it is coupled to the vehicle axle housing a preselected distance from the orbit of the nonmagnetized metal region, so that the nonmagnetized metal region is within sensing distance as it passes by the inductive proximity sensor. The counter is coupled to the inductive proximity sensor for receiving the electrical response and producing a display corresponding to the distance travelled by the vehicle.

8 Claims, 3 Drawing Sheets

DISTANCE MEASURING DEVICE AND METHOD FOR USE WITH VEHICLES

BACKGROUND OF THE INVENTION

1. Field of the Invention

This invention relates generally to distance measurement devices, and in particular to distance measurement devices which may be retrofit onto vehicles.

2. Description of the Prior Art

Farmers in the United States of America have become increasingly dependent upon our federal government farm policy, as implemented by the United States Department of Agriculture. For example, the Agricultural Stabilization and Conservation Service of the Department of Agriculture provides cash subsidies to farmers in amounts dependent upon the number of acres in a farm system that are cultivated as compared to the number of acres that are fallow. It is the farmer's obligation to accurately measure the cultivated acreage. Such figures are submitted to the Department of Agriculture, which spot-checks some of the acreage measurements. Under current regulations, misstatements in the cultivated acreage cannot be corrected and will result in diminishment or loss of cash subsidies, without regard to whether such misstatements were deliberate falsehoods, or honest miscalculations.

The current Agricultural Stabilization and Conservation Service regulations require acreage measurements to be within five percent of the "true" cultivated acreage, as determined by the Department of Agriculture in spot-checks. This five percent tolerance standard cannot be met with confidence by standard vehicle odometers. Consequently, farmers rely upon measurement wheels which are handheld measurement devices. In operation, measurement wheels are dangled from a vehicle window by either the driver or a passenger and are pressed into contact with the earth's surface as the vehicle is advanced over the acreage that is to be measured. Measurement wheels present a variety of significant disadvantages but provide distance measurements that are far more accurate than vehicle odometers. The physical discomfort of the operator is a primary disadvantage when large tracts of land are being measured. In addition, the wheel is subject to inaccuracy, if not held in constant contact with the earth's surface. For example, when the wheel bounces, inaccuracy is introduced into the measurement. Moreover, measurement wheels can collide with the vehicle during operation, causing damage to the vehicle paint and body, not to mention the damage that can occur to the wheel. Finally, measurement wheels are too large to be conveniently stored in the vehicle cab, and therefore may not be readily available when measurements are desired.

Alternately, accurate acreage measurements may be made through aerial surveys of the farm land. However, aerial surveys are frequently expensive, and require the farmer to rely upon a surveyor to provide accurate measurements. Agricultural subsidies are such an important element in modern farm economics that some farmers will make acreage measurements using both the measurement wheel and aerial surveys, in order to ensure that important subsidies are not lost through mismeasurement.

A number of prior art distance measuring devices exist, including Kinney et al., U.S. Pat. No. 4,532,710, for Distance Measuring Device For Golf Carts and the Like; Zeaman et al., U.S. Pat. No. 4,680,454, for Odometer For Golf Cart; and Fleischer, U.S. Pat. No. 4,697,278, for Electronic Hub Odometer. In Kinney et al., a permanent magnet is mounted on a vehicle wheel, and a magnetic sensor is fixedly secured adjacent to the wheel for counting the passage of the permanent magnet as the wheel rotates. Likewise, in Zeaman et al., an odometer for a golf cart is provided which is attached to the wheel of the cart and counts revolutions of the wheel through use of a magnetic head that rotates past a stationary Hall Effect sensor. In Fleischer, a hub odometer is disclosed which employs a permanent magnet and a magnetic read switch for recording the number of revolutions of a vehicle wheel to which the odometer is mounted.

These prior art systems are unacceptable for vehicles which either travel over rough terrain or at high velocities, due to the requirement of a permanent magnet secured to the vehicle wheel. In rough terrain, of the kind encountered in cross-country driving, a permanent magnet affixed to the rotating wheel may become dislodged, causing inaccurate measurements. Furthermore, the coupling of a permanent magnet to the rotating wheel will upset the tire balance, result in premature and uneven tire wear, decrease the comfort of the ride particularly at high speeds, and diminish the safety of travel. In addition, the requirement of permanent magnets mounted to the vehicle wheel increase the complexity of retrofitting a measurement system onto a vehicle. Hub odometers are likewise subject to damage in rough terrain, and are further subject to water damage, since electronic components are disposed at wheel level. Likewise, hub odometers may upset the balance and performance of vehicles onto which they are mounted.

SUMMARY OF THE INVENTION

It is one object of the present invention to provide a distance measuring system which makes measurements of the distance travelled by a vehicle with an accuracy greater than that of standard vehicle odometers.

It is another object of the present invention to provide a distance measuring system which does not require the placement of magnets on the vehicle wheel.

It is yet another object of the present invention to provide a distance measuring system which does not require the placement of equipment on the rotating vehicle wheel, and therefore does not put the vehicle wheel out of balance.

It is still another object of the present invention to provide a distance measuring system in which the sensing equipment is protected from physical trauma and displacement by mounting in the vehicle brake system.

It is another object of the present invention to provide a distance measuring system which can be retrofit onto vehicles with maximum ease and convenience.

It is yet another object of the present invention to provide a distance measuring system which is in place on the vehicle at all times, and does not interfere with high speed travel of the vehicle.

The foregoing objects are achieved as is now described. A means is provided for measuring distance travelled by a vehicle having a wheel coupled to a vehicle axle disposed within a vehicle axle housing, with the wheel having at least one nonmagnetized metal region which rotates with the wheel defining an orbit through which the nonmagnetized metal region passes as the wheel rotates to advance the vehicle. The apparatus includes inductive proximity sensor and a counter means. The inductive proximity sensor is of the type adapted for detecting the presence of nonmagnetized metal within a sensing distance and producing an electrical response thereto; it is coupled to the vehicle axle housing a preselected distance from the orbit of the nonmagnetized metal region, so that the nonmagnetized metal region is within sensing distance as it passes by the inductive proximity sensor. The counter is coupled to the inductive proximity sensor for receiving the electrical response and producing a display corresponding to the distance travelled by the vehicle.

The above as well as additional objects, features, and advantages of the invention will become apparent in the following detailed description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2 depicts in exploded form a wheel and drum brake system of the vehicle of FIG. 1a.

DETAILED DESCRIPTION OF THE INVENTION

Figure 1A:
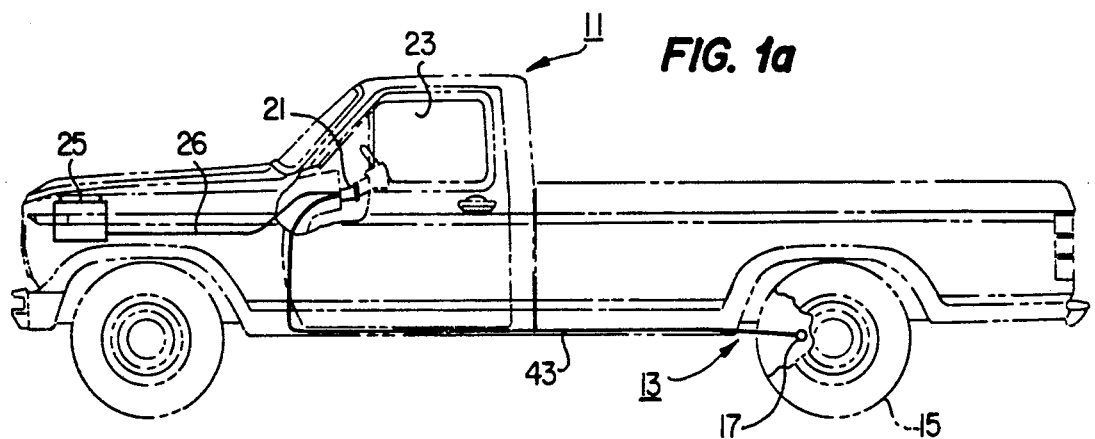
FIG. 1a is a perspective view of the distance measuring system of the present invention installed in a vehicle shown in partial cutaway phantom view.

With reference now to the figures and in particular with reference to FIG. 1, vehicle 11 is shown in partial cut-away phantom view, and is equipped with distance measuring system 13 of the present invention. Inductive proximity sensor 17 of distance measuring system 13 is mounted in the brake system of right rear wheel 15, and sends electrical signals via cable 43 to electronic counter 21, which is disposed in vehicle cab 23. Distance measuring system 13 of the present invention is electrically connected to 12 volts DC from vehicle battery 25 through battery power wire 26.

Figure 1B:
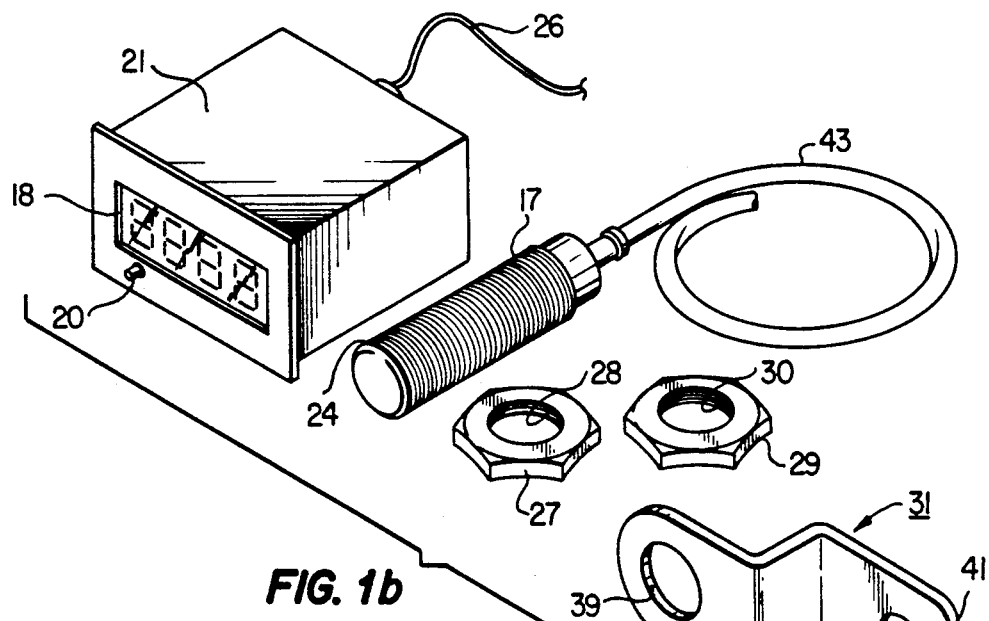
FIG. 1b depicts the individual components of the distance measuring device of the present invention.

The components which makeup the distance measuring system 13 of the present invention, are depicted in kit form in FIG. 1b. The kit includes electronic counter 21, inductive proximity sensor 17, threaded washers 27, 29, and bracket 31. In the preferred embodiment, electronic counter 21 is a totalizing counter Model No. 10108 manufactured by Syrelec. A plurality of input terminals are provided on the electronic counter for coupling to contact closures, switching transistors, or proximity switches. Electronic counter 21 is adapted to produce a count of the voltage pulses provided at the input terminals. The number of voltage pulses sensed are displayed at liquid crystal display 18. The electronic counter 21 may be reset to zero by reset button 20. Electronic counter 21 is powered by two Size N Alkaline batteries with a projected four year life. If mercury batteries are used instead, an eight year life is expected.

Twelve volts DC is provided to one input terminal of electronic counter 21 by battery power wire 26.

The kit also includes inductive proximity sensor 17 and associated cable 43. Proximity sensor 17 is cylindrical in shape, and has a threaded outer surface 24 adapted to receive threaded washers 27, 29, which have internally threaded bores 28, 30 respectively. Bracket 31 includes two substantially planar regions 33, 35 which are offset a selected distance by a midregion 37 which is perpendicular to each substantially planar surface. Sensor bore 39 is provided in planar surface 33, while mounting bore 41 is provided in planar surface 35. Sensor bore 39 is adapted in diameter to receive cylindrical inductive proximity sensor 17, which is held in place by threaded washers 27, 29. Specifically, threaded washer 27 is advanced along the threaded outer surface of inductive proximity sensor 17 to a desired location. Next, the inductive proximity sensor 17 is inserted through sensor bore 39. Then, threaded washer 29 is advanced along threaded outer surface 24 of inductive proximity sensor 17 to engage planar surface 33 between said washers and secure inductive proximity sensor 17 in a desired position. Note that inductive proximity sensor 17 may be advanced or retracted through sensor bore 39 by simultaneously rotating threaded washers 27, 29.

In the preferred embodiment, inductive proximity sensor 17 is a Syrelec brand inductive proximity switch Model No. EN5008. Such proximity sensors emit a radio frequency signal, and have a detector circuit which measures an oscillator output. When a metal target enters the sensing field, eddy currents are generated in the metal. These eddy currents reduce the frequency of oscillation, which is detected by the detector circuit. In the case of on-off digital sensors, the detector signals a Schmitt trigger circuit which turns on the output device. Proximity sensors will detect all metals, but have a greater sensitivity to ferrous metals. Nonferrous metals can be detected, but at a shorter sensing distance. The "sensing distance" is also known as the "operating point," and is measured from the sensor face to the metal target. It is at this distance that the sensor electrically responds to metal. Metal outside sensing the sense will not produce an electrical response in the sensor, but metal within the sensing distance will produce an electrical response indicating the presence of the metal.

Figure 1C:
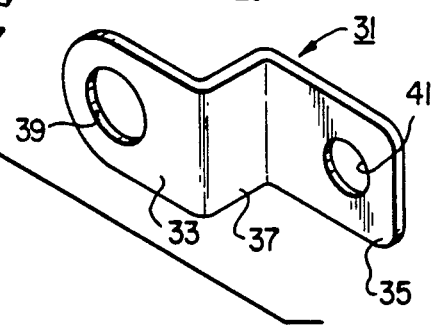
FIG. 1c is a block diagram and electrical schematic of the electrical interconnection of the electronic counter and inductive proximity sensor of the present invention.
Figure 1C:
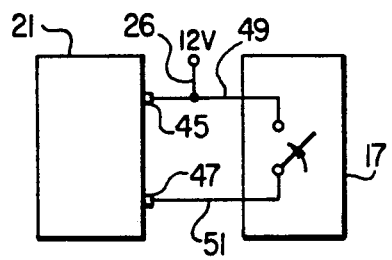

FIG. 1c is a block diagram electrical schematic of the interconnection of electronic counter 21 and inductive proximity sensor 17. Input terminals 45, 47 are provided on electronic counter 21. Twelve volts DC from vehicle battery 25 is provided to terminal 45 via battery power wire 26. Wire 49 of cable 43 is also coupled to terminal 45. Wire 51 from cable 43 is coupled to input terminal 47. Inductive proximity sensor 17 operates as a switch for completing the circuit and incrementing electronic counter 21.

Figure 2:
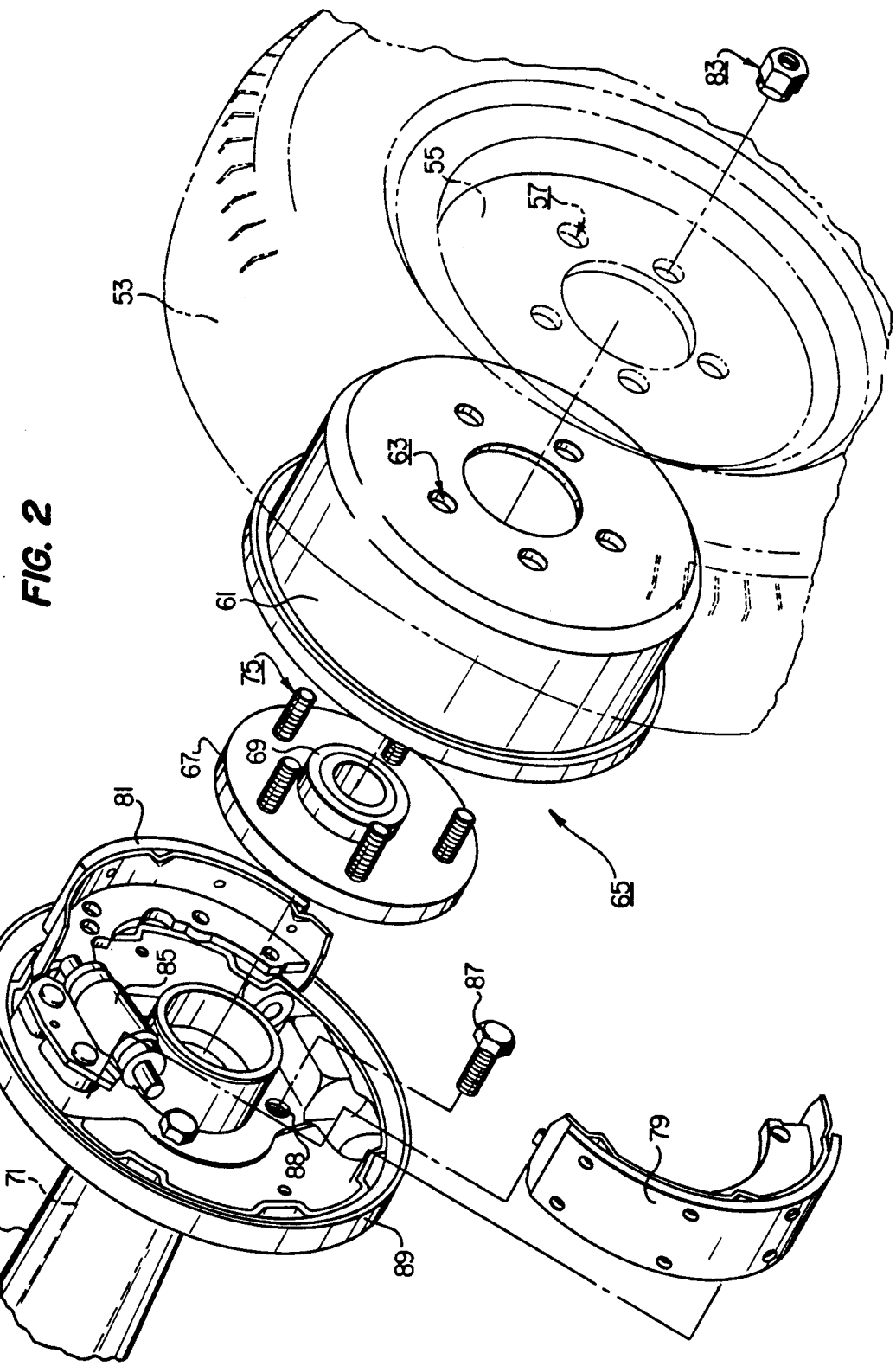

FIG. 2 is an exploded view of right rear wheel 15. Tire 53 is mounted on rim 55, which has a plurality of lug bolt openings 57. Brake drum 61 of drum brake system 65 interfaces with wheel 55, and has a plurality of lug bolt openings 63 which align with the lug bolt openings 57 of wheel 55. Lug bolt plate 67 is a disc-shaped plate which extends radially outward from bearing assembly 69, and rotatably couples wheel 55 to vehicle axle 71, depicted in fragmentary phantom view within axle housing 73. A plurality of lug bolt openings 77 (obscured in FIG. 2) are provided in lug bolt plate 67, and are adapted for receiving lug bolts 75. Lug bolts 75 serve to secure wheel 55 to axle 71 by passing through lug bolt openings 63 of brake drum 61 and lug bolt openings 57 of wheel 55. Lug bolts 75 are secured in place by a plurality of lug nuts 83.

As is known in the industry, brake shoes 79, 81 are selectively actuated by brake cylinder 85 to frictionally engage brake drum 61, when the operator desires to slow or stop the vehicle. Brake shoes 79, 81, and brake cylinder 85 are secured to a support plate 89, which is in turn secured to axle housing 73 by a plurality of mounting bolts 87.

Of course, the drum brake system 65 of FIG. 2 has been simplified for purposes of clarity and exposition, and a number of springs and cables which are not necessary for an understanding of the present invention have been omitted. As is evident from FIG. 2, the brake shoes 79, 81 and brake cylinder 85 and other braking components are sheltered from physical damage by brake drum 61 which interfaces with support plate 89 to form a type of housing around the brake components. This protects the brake components from physical damage and to some extent from the entry of water into the brake system 65. Therefore, drum brake system 65 provides a somewhat sheltered environment adjacent to the vehicle wheel.

Figure 3:
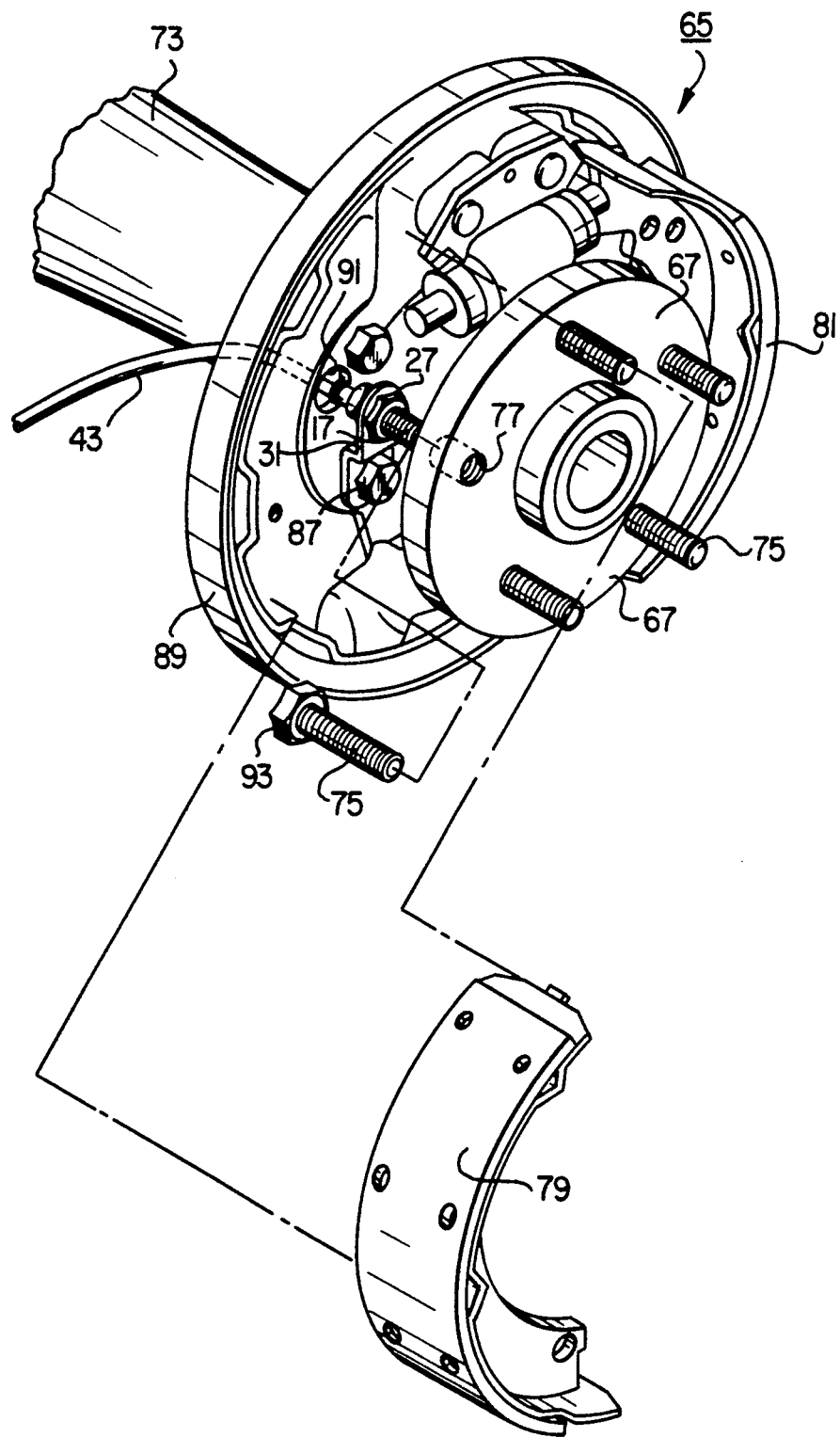
FIG. 3 depicts the sensor of the distance measuring system of the present invention installed in the drum brake system of FIG. 2.

With reference now to FIG. 3, brake drum system 65 is depicted with inductive proximity sensor 17 coupled to support plate 89 between lug bolt plate 67 and support plate 89 by bracket 31. Specifically, bracket 31 is coupled by mounting bolt 87 to support plate 89 and axle housing 73, at mounting bore 41. Inductive proximity sensor 17 is secured in sensor bore 39 by threaded washers 27, 29. Cable 43 is routed through drilled hole 91 in support plate 89 of brake system 65. Drilled hole 91 is provided in support plate 89 during the installation process. Specifically, one lug bolt 75 is removed from lug bolt plate 67, and a drill bit is placed in lug bolt opening 77 and a hole is then drilled in support plate 89. This allows lug bolt 75 to be aligned with inductive proximity sensor 17. Therefore, inductive proximity sensor 17 is coupled to axle housing 73, and positioned between support plate 89 and lug bolt plate 67.

In this position, inductive proximity sensor 17 is protected from physical damage and displacement when the vehicle is driven over rough terrain. Lug bolt heads 93 provide a nonmagnetized metal target which causes inductive proximity sensor 17 to provide an electrical response corresponding to the passage of each lug bolt head 93. In the preferred embodiment, inductive proximity sensor 17 is a inductive proximity switch, which simply closes the electrical switch, completing the circuit depicted in FIG. 1c.

The electrical responses of inductive proximity switch 17 are counted by electronic counter 21. As shown in FIG. 3, five lug bolts 75 are provided, and one complete revolution of the vehicle wheel will result in the passage of five lug bolt heads 93 past inductive proximity sensor 17, resulting in the increment of electronic counter 21 by five counts. Of course, if greater of fewer lug bolts are provided, the count will differ. The count provided by electronic counter 21 will correspond to the distance travelled by vehicle 11. Distance travelled can be calculated by dividing the total count of electronic counter 21 by the number of lug bolts present on the wheel of the vehicle, and multiplying the result by the outer circumference of tire 53 of FIG. 2.

The distance measuring device of the present invention may be installed in vehicle 11 by removing tire 53 and brake drum 61 of FIG. 2. Then, mounting bolt 87 is removed, as depicted in FIG. 2. Mounting bore 41 of bracket 31 is then aligned with threaded bore 88 of FIG. 2 from which mounting bolt 87 was removed. Mounting bolt 87 is then recoupled to threaded bore 88. Next, as shown in FIG. 3, a lug bolt 75 is removed from lug bolt plate 67, and hole 91 is drilled in support plate 89. Sensor bore 39 of bracket 31 is aligned with drilled hole 91, and inductive proximity sensor 17 is pushed through drilled hole 91 of support plate 89. Washer 27 is then coupled to inductive proximity sensor 17 at a selected position. Inductive proximity sensor 17 is next positioned in sensor bore 39 of bracket 31, and threaded washer 29 is advanced along the threaded outer surface 24 of inductive proximity sensor 17. Threaded washers 27, 29 are adjusted to position inductive proximity sensor 17 at a preselected distance from lug bolt heads 93. More specifically, the outer edge of inductive proximity sensor 17 is positioned within sensing distance of lug bolt heads 93, but in a position which leaves lug bolt plate 67 outside the sensing distance. In this configuration, inductive proximity sensor is positioned directly above the orbit of lug bolt heads 93 as the vehicle wheel rotates to advance vehicle 11. However, inductive proximity sensor 17 is not sensitive to any other metal components of drum brake system 65, since such components are all outside the sensing range of inductive proximity sensor 17. Cable 43 is secured to the underside of vehicle 11, routed into vehicle cab 23, and coupled to counter 21. Battery power wire 26 is then routed from electronic counter 21 to vehicle battery 25.

In operation, electronic counter 21 is reset prior to the taking of a measurement. Vehicle 11 is then advanced over terrain requiring measurement. As the vehicle advances, vehicle axle 71 rotates rear wheel 15. As tire 53 rotates, lug bolt heads 93 are rotated through an orbit above inductive proximity sensor 17. Inductive proximity sensor 17 electrically senses the presence of nonmagnetized metal within the sensing distance, and as shown in FIG. 1c, electrically completes a circuit which allows the 12 volts DC from vehicle battery 25 to be sensed and counted by electronic counter 21. As stated above, when measurement is completed, the total count is divided by the number of lug bolts present on one wheel of the vehicle to provide the total number of revolutions of rear wheel 15. This figure is then multiplied by the outer circumference of tire 53 to provide the total distance travelled.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A means for measuring distance traveled by a vehicle having a wheel coupled to a vehicle axle disposed within a vehicle axle housing, with said wheel having at least one nonmagnetized vehicle wheel bolt which rotates with said wheel defining an orbit through which said at least one nonmagnetized vehicle wheel bolt passes as said wheel rotates to advance said vehicle, comprising:
  a proximity sensor of the type adapted for detecting the presence of nonmagnetized metal within a sensing distance and providing an electrical response thereto, coupled to said axle housing a preselected distance from said orbit of said at least one nonmagnetized vehicle wheel bolt wherein said at least one nonmagnetized vehicle wheel bolt is within said sensing distance as it passes by said inductive proximity sensor, for indicating the passage of said at least one nonmagnetized vehicle wheel bolt past said inductive proximity sensor as said wheel is rotated to advance said vehicle; and
  counter means coupled to said inductive proximity sensor for receiving said electrical response and producing a display corresponding to the distance traveled by said vehicle, wherein distance travelled by said vehicle may be measured without requiring the mounting of equipment to said wheel.

2. A means for measuring distance traveled by a vehicle having a brake system with a support plate stationary relative to a vehicle wheel, said wheel being coupled to a vehicle axle at a lug bolt plate by a plurality of nonmagnetized lug bolts having lug bolt heads which are rotated through an orbit between said support plate and said lug bolt plate as said wheel turns, comprising:
  an inductive proximity sensor of the type adapted for detecting the presence of nonmagnetized metal within a sensing distance and providing an electrical response thereto, coupled to said support plate and disposed between said support plate and said lug bolt plate a preselected distance from said orbit of said nonmagnetized lug bolt heads, wherein said nonmagnetized lug bolt heads are within said sensing distance as said nonmagnetized lug bolt heads pass by said inductive proximity sensor but with said lug bolt plate outside said sensing distance, for indicating the passage of said nonmagnetized lug bolt heads past said inductive proximity sensor as said wheel is rotated to advance said vehicle; and
  counter means electrically coupled to said inductive proximity sensor for receiving said electrical response and producing a display corresponding to the distance traveled by said vehicle.

3. A means for measuring distance traveled by a vehicle according to claim 2 wherein said inductive proximity sensor is coupled to said support plate by a bracket.

4. A means for measuring distance travelled by a vehicle having a passenger compartment according to claim 2, wherein said counter means is disposed within said vehicle passenger compartment allowing distance measurements to be read within said vehicle.

5. A method of measuring distance traveled by a vehicle having at least one nonmagnetized vehicle wheel bolt which rotates with said wheel defining an orbit through which said at least one nonmagnetized vehicle wheel bolt passes as said wheel rotates to advance said vehicle, comprising the steps of:
  providing a sensor of the type adapted for detecting the presence of at least one nonmagnetized vehicle wheel bolt within a sensing distance and producing an electrical response in response thereto;
  connecting said sensor to a portion of said vehicle which is stationary relative to said wheel as said wheel rotates and within said sensing distance of said at least one nonmagnetized vehicle wheel bolt;
  sensing said at least one nonmagnetized vehicle wheel bolt with said sensor as said wheel is rotated to advance said vehicle; and
  counting electrical responses produced by said sensor to provide a measure of the distance travelled by said vehicle.

6. A method of measuring distance travelled by a vehicle having a brake system with a support plate stationary relative to a vehicle wheel, said wheel being coupled to a vehicle axle at a lug bolt plate by a plurality of nonmagnetized lug bolts having lug bolt heads which are disposed between said lug bolt plate and said support plate and which are rotated through an orbit above said support plate as said wheel turns, comprising the steps of:
  providing an inductive proximity sensor of the type adapted for detecting the presence of nonmagnetized metal within a sensing distance and producing an electrical response thereto;
  coupling said inductive proximity sensor to said support plate between said support plate and said lug bolt plate, a preselected distance from said orbit of said lug bolt heads allowing said lug bolt heads to pass by said inductive proximity sensor within said sensing distance but with said lug bolt plate outside said sensing distance;
  providing a counter for receiving said electrical responses from said inductive proximity sensor and producing a display;
  electrically coupling said inductive proximity sensor to said counter;
  sensing the passage of lug bolt heads with said inductive proximity sensor as said lug bolts heads are rotated through said orbit past said inductive proximity sensor;
  counting said output signals with said counter; and
  displaying with said counter a figure corresponding to the distance travelled by said vehicle.

7. A method of measuring distance travelled by a vehicle according to claim 6, further comprising:
  providing at least one conductor;
  cutting a hole in said support plate of said brake system;
  routing said at least one conductor from said brake system, through said hole, to said counter; and
  disposing said counter at a desired location within said vehicle.

8. A means for measuring distance traveled by a vehicle having a wheel and a wheel brake drum coupled to a vehicle axle, said vehicle axle disposed within a vehicle axle housing, with said wheel brake drum having at least one non-magnetized metal element located in the interior of said wheel brake drum and which rotates within said wheel brake drum defining an orbit through which said at least one non-magnetized metal element passes as said wheel rotates to advance said vehicle, comprising:
  a proximity sensor of the type adapted for detecting the presence of non-magnetized metal within a sensing distance and providing an electrical response thereto, coupled to said axle housing a preselected distance from said orbit of said at least one non-magnetized metal element wherein said non-magnetized metal element is within said sensing distance as it passes by said inductive proximity sensor, for indicating the passage of said non-magnetized metal element past said inductive proximity sensor as said wheel is rotated to advance said vehicle; and
  counter means coupled to said inductive proximity sensor for receiving said electrical response and producing a display corresponding to the distance traveled by said vehicle, wherein distance traveled by said vehicle may be measured without requiring the mounting of equipment to said wheel.

* * * * *